W. J. McCOY.
CEMENT BLOCK MACHINE.
APPLICATION FILED MAY 14, 1921.

1,438,448.

Patented Dec. 12, 1922.
6 SHEETS—SHEET 1.

INVENTOR.
Walter J. McCoy

BY

ATTORNEY.

W. J. McCOY.
CEMENT BLOCK MACHINE.
APPLICATION FILED MAY 14, 1921.

1,438,448.

Patented Dec. 12, 1922.
6 SHEETS—SHEET 6.

Walter J. McCoy
INVENTOR.

BY

ATTORNEY.

Patented Dec. 12, 1922.

1,438,448

UNITED STATES PATENT OFFICE.

WALTER JOSEPH McCOY, OF OMAHA, NEBRASKA.

CEMENT-BLOCK MACHINE.

Application filed May 14, 1921. Serial No. 469,488.

*To all whom it may concern:*

Be it known that I, WALTER J. McCOY, a citizen of the United States, residing at Omaha, in the county of Douglas and State of Nebraska, have invented certain new and useful Improvements in Cement-Block Machines, of which the following is a specification.

This invention relates to a block machine for pressing cement or clay blocks, bricks, tile or the like; and it has for its object to provide a new and improved apparatus which will be comparatively inexpensive, durable and efficient; and by means of which a plurality of blocks, bricks or other articles may be conveniently manufactured at one operation of the machine, which may be operated by hand or power.

The invention further resides in improved means for coring the blocks, improved tamping means for holding the blocks during the removal of the molds from thereabout, and means operable by the molds by and during their removal for releasing the tamping means from their operative position.

Further, the invention resides in the features of construction and the arrangements and combinations of parts hereinafter described and claimed, reference being had to the accompanying drawings wherein:

Figures 1 and 1ª show a side elevation of the improved machine;

Figure 4:
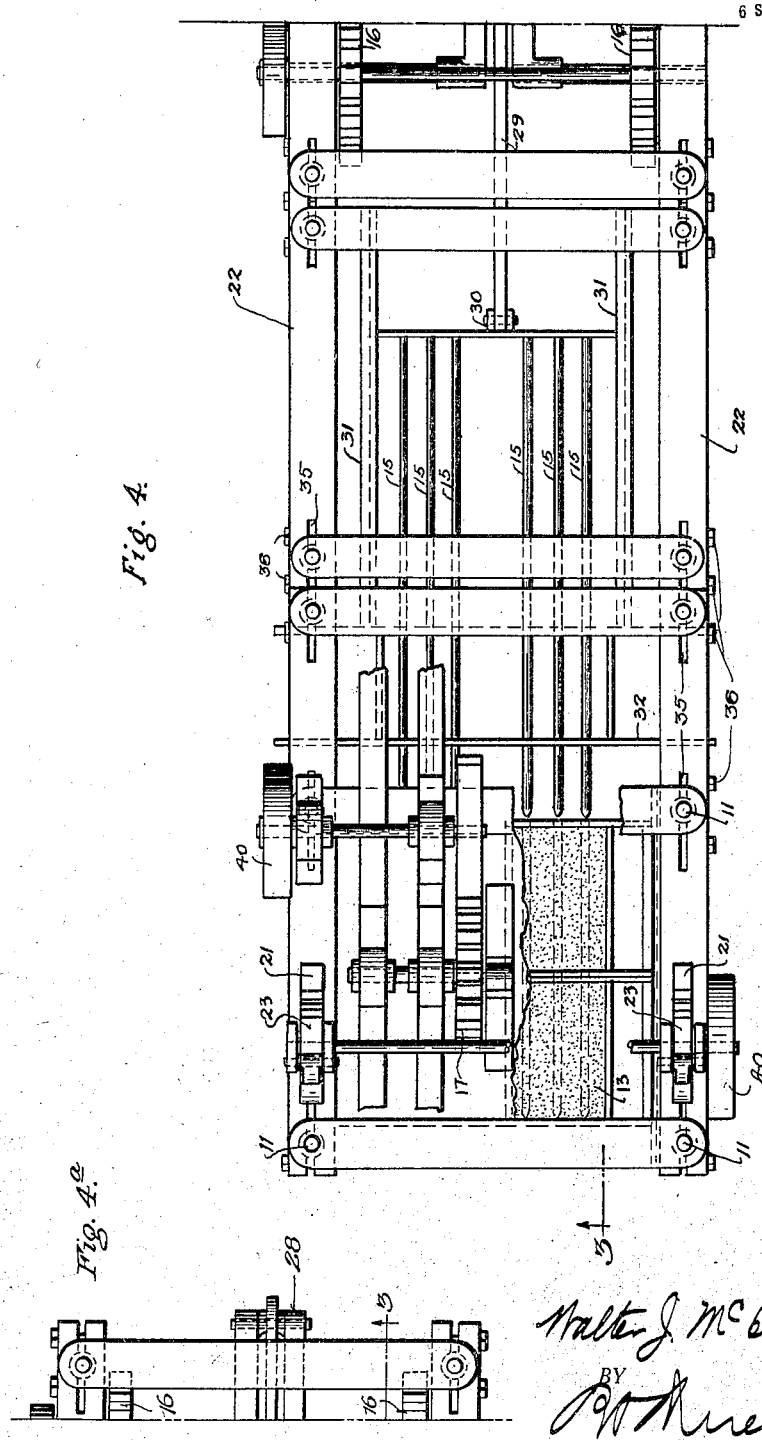
Figure 5:
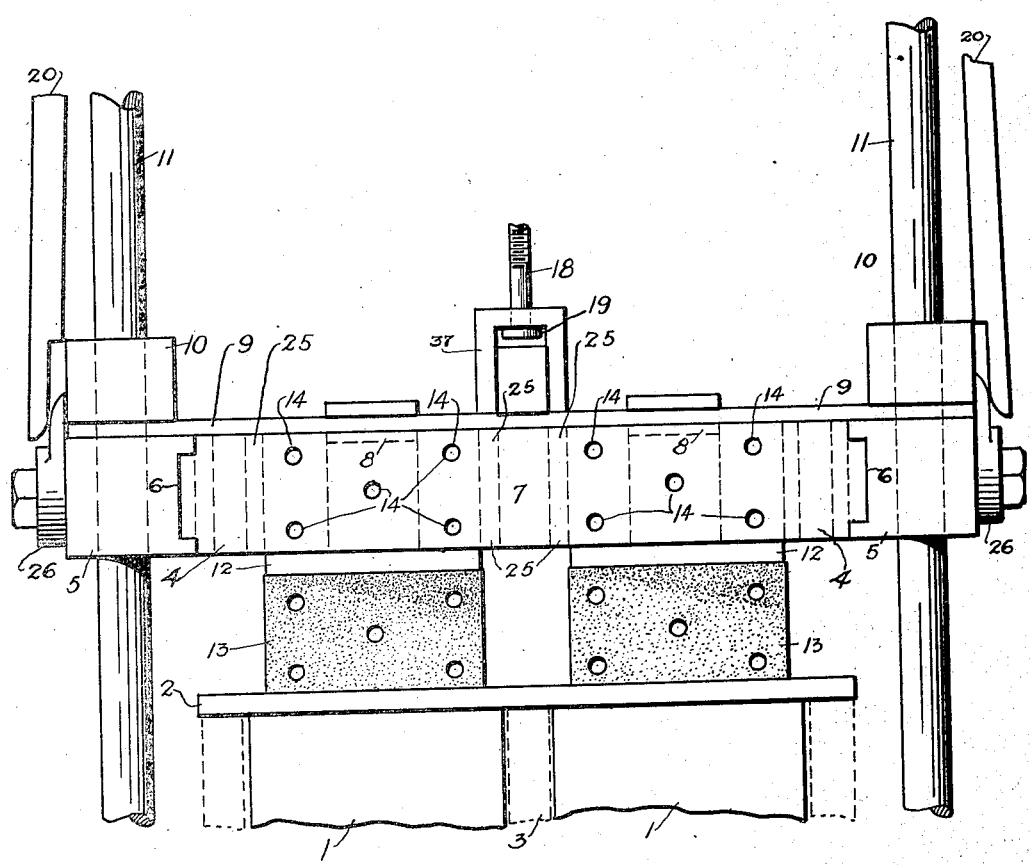
Figure 7:
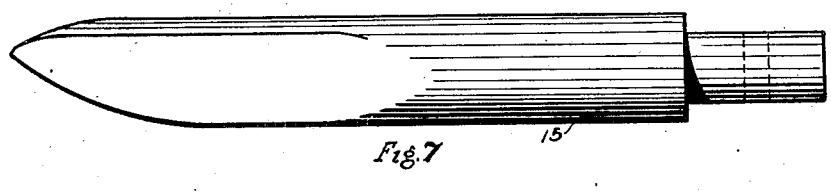
Figure 8:
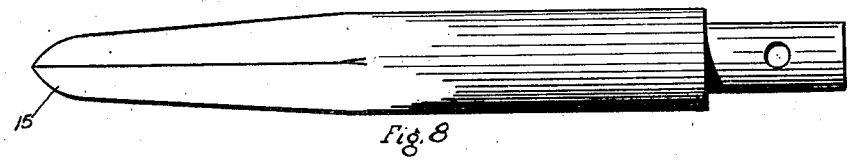
Figure 6:
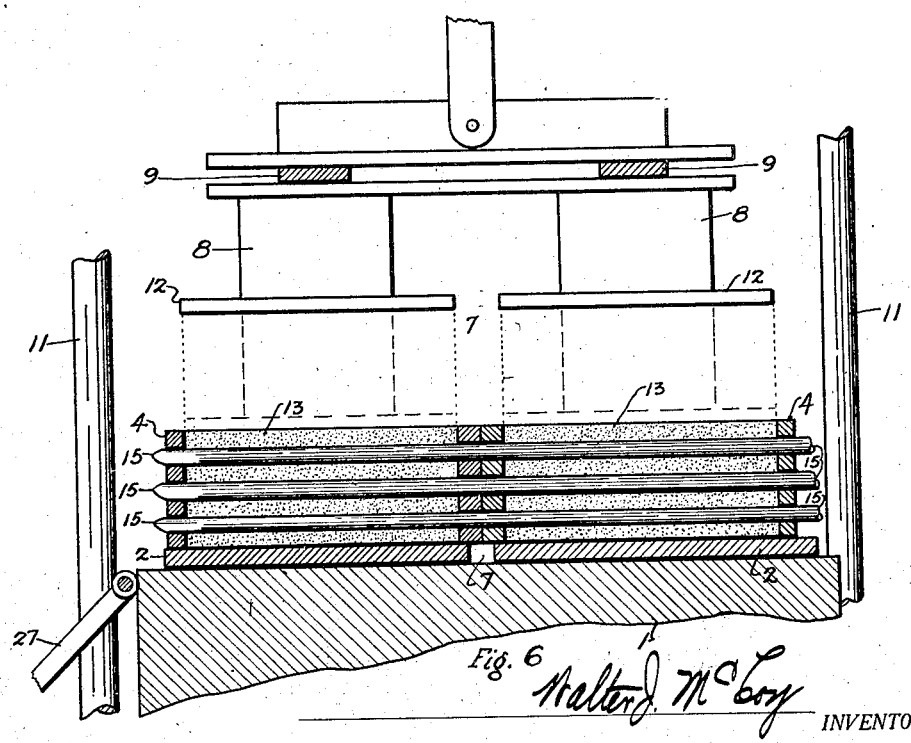

Figures 4 and 4ª show a top plan view thereof with portions broken away;

Figure 5 is a detailed view depicting the mold carrier in the act of releasing the tamper carrier;

Figure 6 shows the brick being tamped with the cores in their operative position; and Figures 7 and 8 are side and bottom elevations, respectively, of the removable core points employed in the present construction.

Referring more in detail to the drawings, the numeral 1, designates the base of the machine which is built separate from the frame work of the machine and consists of a pair of solid, block-like members for supporting the pallets 2, the latter being shown as arranged transversely of the machine and extending across both base members. Intermediate and end supports 3 may also be provided for the pallets, as indicated.

The frame of the machine consists of a plurality of upright posts 11 joined together at their upper and lower ends by transverse and longitudinal members or bars 22, the latter having slots 35 in which the post ends are clamped by bolts 36 so that relative adjustment between posts may be obtained. Vertically slidable on the posts 11 on opposite sides of the base 1 are two side members 5 extending lengthwise of the machine and formed on their inner faces with longitudinal grooves for adjustably receiving the tongues 6 of the molds 4, being secured in their operative position in any suitable manner. The molds are divided by partitions 7 and 25 as shown. Each side member 5 has its ends slidably embracing adjacent posts 11, and above the side members is a pair of tamper supports 10 also slidable vertically on the posts and connected by two cross bars 9 on which the tampers 8 are carried, said tampers having enlarged tamping faces 12. Obviously, for the different designs of blocks or brick the tamping faces 12 and their supports are replaced by correspondingly designed parts.

The ends or transverse walls of the molds are formed with apertures 14 to receive and guide the coring rods 15 through the brick. These rods are supported at their forward ends by a cross guide bar 32 and are connected at their rear ends to a cross head 30 that has sliding support in a pair of opposed guides 31. Power applied to gears 16, which are journaled in bearings of the frame, is transmitted to the coring rods by the crank 28 and pitman 29, the latter being pivoted to the cross head 30. The free ends of the coring rods have their underside beveled to an edge to provide, in effect, downwardly converging, angular tamping faces which act to pack the material in the mold as the rods are forced therethrough. It will be noted that the pitman has adjustable connections with the crank shaft so that the stroke of cores 15 may accordingly be varied.

Spring latches 20 normally engage over the slidable supports 10 to hold them against upward movement, and rack bars 21 support the side members 5 on their lower ends and are engaged by interrupted gears 23 at their upper ends whereby the side members and their supported molds 4 may be intermittently lifted. The tamper support is provided with a yoke 37 in which engages the head 19 of a screw 18 which provides an adjustable connection with a pitman 38 operable from a gear 17 and interrupted gear 39. The action of the gear 39 is to release the tampers when elevated so that their downward blow will be unimpeded. A pawl 24 engages gear 23 to lock the molds elevated during the removal of the brick.

Figure 1:
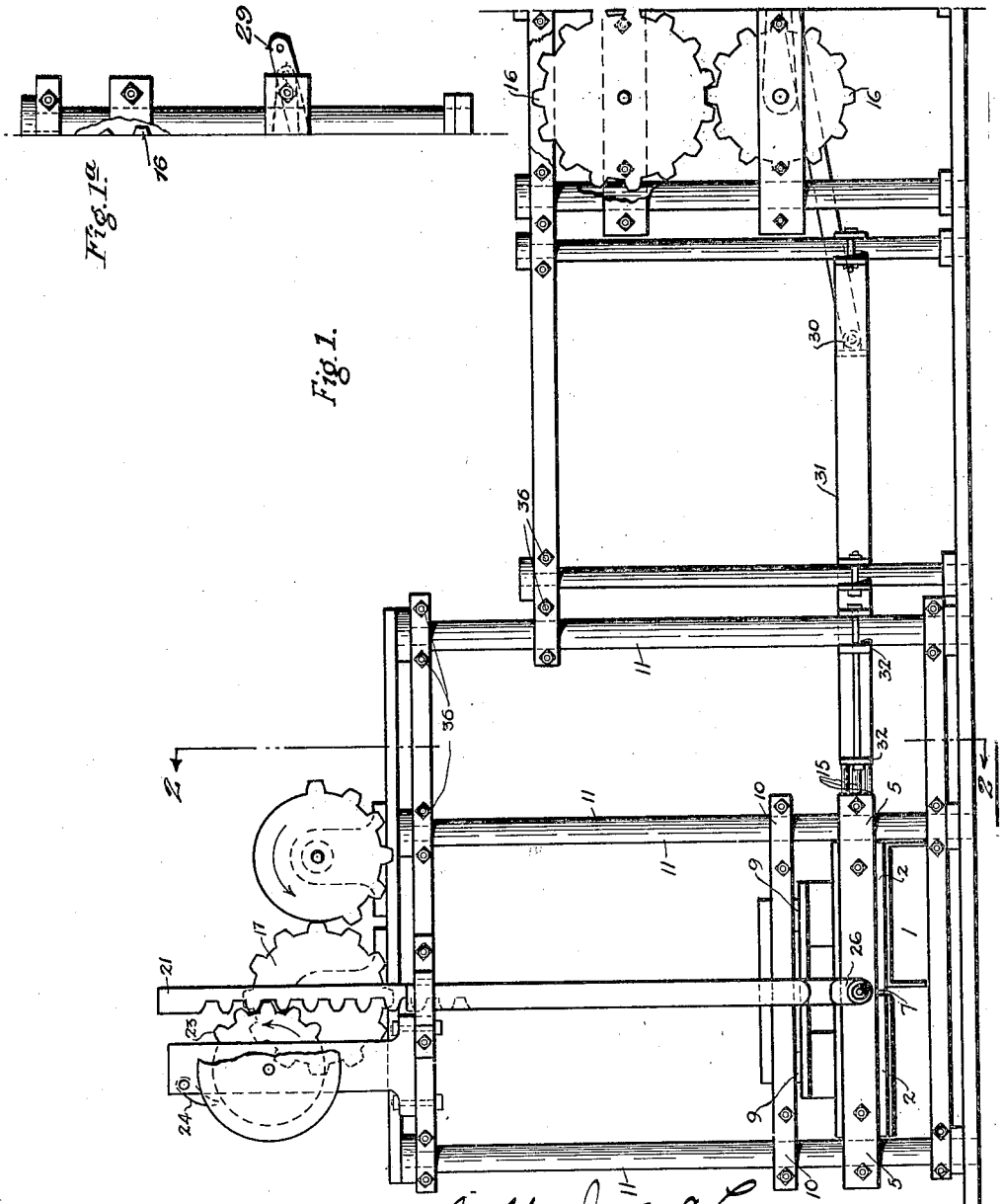
Figure 2:
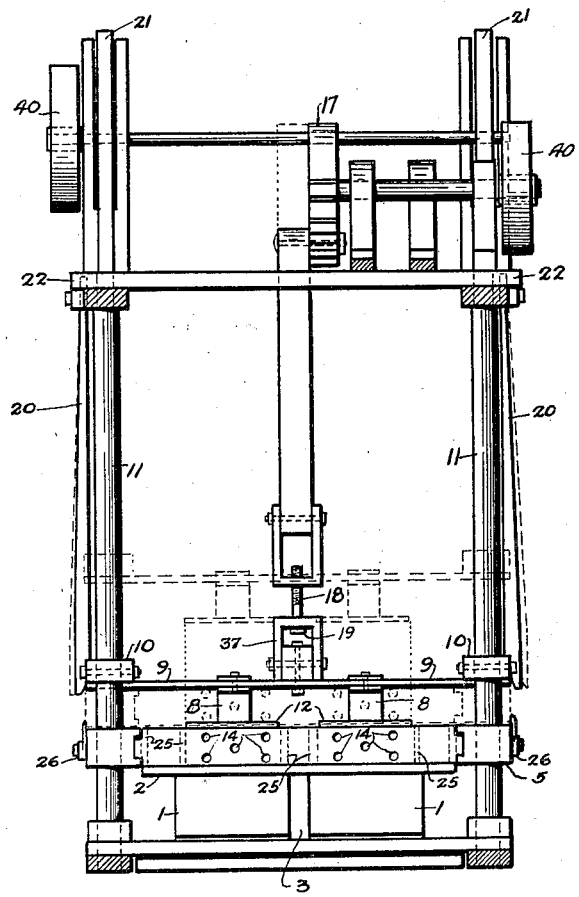
Figure 2 is a transverse section on line 2—2 of Figure 1, showing the mold end thereof.
Figure 3:
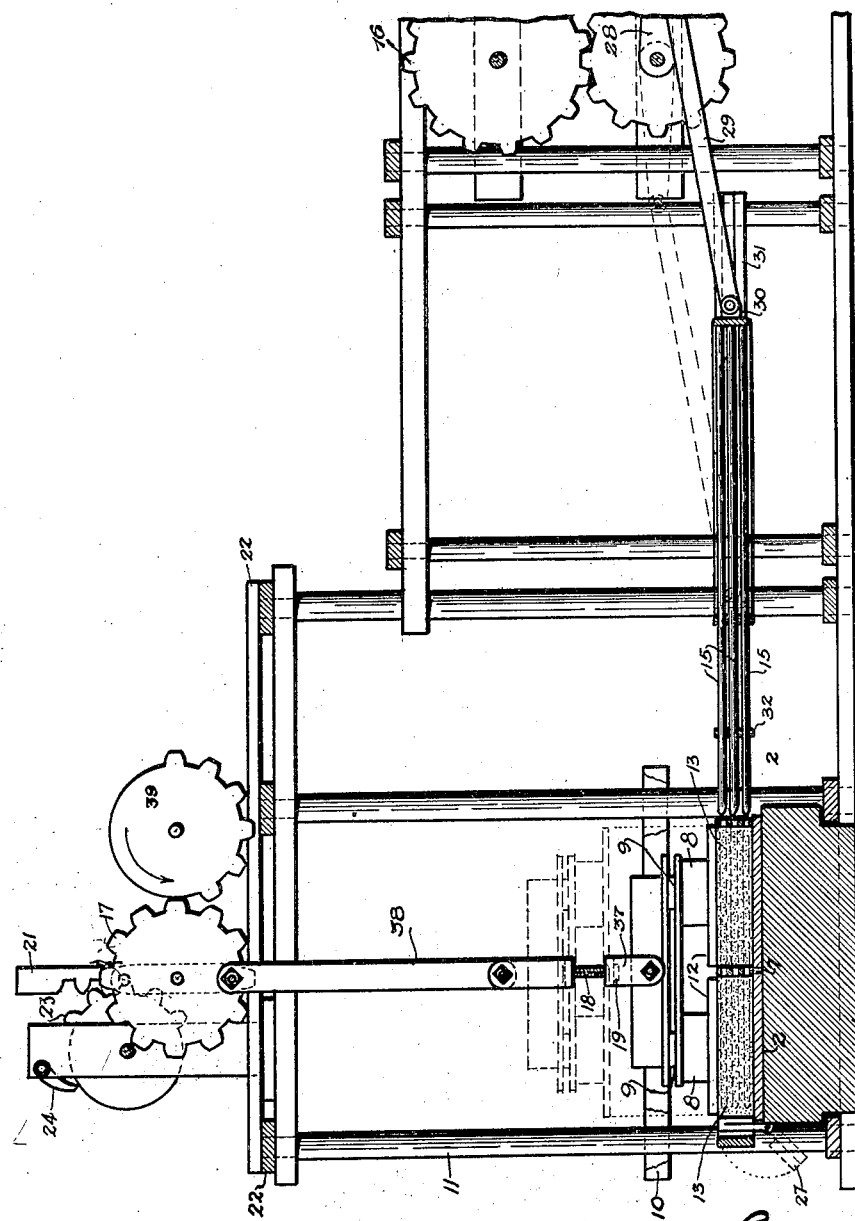
Figure 3 is a longitudinal vertical section of the machine on line 3—3 of Figure 4.

In practice power is applied to the several pulleys 40 for driving the gears 16, 23 and 39. The concrete, cement, clay, or other material is placed in the molds 4 and the tampers 8, with their faces 12, are successively elevated and released by means of gear 39, to effect a rapid, reciprocatory tamping action. During or immediately following this operation the cores 15 are inserted completely through the block 13 and molds, or in the event that a "facing" brick is desired a special facing plate 27 is utilized which is not reached by the cores 15 so that the face of the brick will not be punctured. The special face plate 27 is hinged to be swung up within the mold to replace the adjacent end wall, and a single partition 7 may also be used as a common partition between the molds, as is depicted in Figure 3.

The tamping completed, the gear 23 lifts on the side members 21 to elevate the mold while the compressed brick is retained on the pallets 2. When the molds have cleared the cast brick, the side members 10, which heretofore have been held in their lowered position by means of catches or latches 20, are elevated by the gear 23, such operation being permitted by reason of the trips 26, on the side members 5, moving upwardly and camming against the beveled lower ends of the latches to shift them outwardly from over the tamper supports 10, as depicted in Figure 5. These supports, being released, are now moved upwardly from the molds by the intermeshing of gears 39 and 17.

These cycles of operation are repeated in rapid order so that the bricks may be manufactured very expeditiously. From Figure 6 it will be noted that the face plate will assume a position beyond the normal travel of the cores. The facing brick will therefore have the bores extending in proximity to the facing without interrupting or marring the integrity thereof. The penetrating ends of the cores may be removed, as shown in Figures 7 and 8, for sharpening to replacement by others of different design. The molds 4 may be changed quickly and other molds set in their place to suit the article desired to be made. The tampers 8 are adjustable and easily changed to the design desired. The face plates 12, which are connected to the bottom of tampers 8 and may be of any shape, are so designed so as to snugly fit into and pass through the molds 4 and form the face of the block or brick 13, which is made on the edge face upwards. The core points 15, being beveled on the lower sides, when passing through molds 4 push the material downward and sidewise, pressing the material solidly in the bottom of the molds.

With this machine concrete almost as wet as that used for mortar can be successfully molded into blocks or bricks, the cores 15, pressing the center and bottom very solidly and forcing the water out while the loose material on top is churned by the stroke of the tampers 8, and this brings the water and cement to the top making an almost impervious water face. The screw lifting device 18, and stop 19 are set to govern the width of the block or brick 13, and when the material is tamped the desired size, the screw 18, or stop 19 holds off further pressure, and the weight of the tampers are now supported by the adjustable stop 19.

The spring latches 20 are adjustably mounted and are set at a predetermined point according to the width or thickness of the brick. Consequently, as the tamping progresses the bars 10 will gradually lower until they pass below the catch ends of the latches when the latter will spring over the bars and prevent the same from moving upwardly. The screw lifting device 18 and stop 19 will also hold off further pressure.

What is claimed is:

1. In a block machine, a frame having upright posts, longitudinal lower side members slidable on the posts, a mold between the side members having a groove and tongue connection along its sides with the inner sides of the side member, longitudinal upper side members slidable on the posts, connecting bars for the upper members, a tamper carried by said bars, vertical spring latches connected at their upper ends to the posts and engaging on top of the upper members and having lower beveled ends which are spaced from the sides of the upper members, trips extending upwardly from the lower members and engageable with the beveled ends of the latches to move the latter out of engagement with the upper members, means secured to the connecting bars of the upper members to move same upwardly, and means connected to each of the lower members to move same upwardly.

2. In a block machine, a frame, a mold carrier on the frame, a tamper carrier movable on the frame, spring latches secured at their upper ends to the frame and having their lower end portions formed to engage on top of the mold carrier and having downwardly disposed parts, and trips extending upwardly from the mold carrier and formed to engage the downwardly disposed parts of the latches to move the latter laterally and out of engagement with the mold carrier.

3. In a block machine, a frame, a mold thereon having a perforated wall, coring rods movable through the perforations of said wall, a transverse guide having openings movably receiving the forward ends of the rods therethrough, longitudinal guides on opposite sides of the rods, a cross head slidable between the longitudinal guides and having the rods secured thereto, and adjustable means to reciprocate the cross head.

4. In a block machine, a mold having perforated sides, a core slidable through the perforations, and a hinged imperforate facing plate mounted so as to be swung upwardly to lie within the mold to replace the adjacent perforated side thereof when the adjacent face of the block is not to be punctured.

5. In a block machine, a mold having a perforated wall, coring rods movable through the perforations of the wall, said rods having the sides of their forward ends beveled downwardly to a substantially knife edge whereby in passing through the material said forward ends press the material from the interior of the body of the material both in an outward and downward direction, and tamping means operable on top of the body of the material for pressing positively the material above the coring rods downwardly.

6. In a block machine, a frame, a tamper carrier thereon, a mold carrier on the frame, a shaft on the frame, interrupted gears on the shaft, racks connected to the mold carrier and meshed with the gears so as to be raised and lowered by the latter, a pawl engageable with one of the gears to hold the shaft against rotation and thereby the mold carrier in raised position, a second shaft on the frame, a gear on the second shaft, a pitman connected to the last named gear and to the tamper carrier, an interrupted gear meshed with the last named gear, and means to actuate the shafts.

7. In a block machine, a mold having a perforated wall, coring rods slidable through the perforations of said wall, and removable ends for said rods formed to penetrate the material and pack same.

8. In a block machine, a frame embodying a base, a mold thereon having a perforated side, a core rod slidable through the perforation of the mold side to form a bore in the block, the under side of the free end portion of the rod being beveled downwardly convergent to a longitudinal bottom edge.

9. In a block machine, a frame embodying a base, a mold thereon having a perforated side, core members projectable through the perforations of the side for creating openings in the block, an impelling crank, and an adjustable pitman connection between the core members and the crank.

10. In a block machine, a frame embodying upright posts, a mold carrier slidable on the posts, a tamper carrier also slidable on the posts above the mold carrier, a mold adjustably supported by its carrier, a tamper also adjustable on its carrier, means for elevating the mold carrier independently of the tamper carrier whereby the tamper may remain operative during lifting of the mold carrier and its mold, an outwardly movable, depending latch secured to the frame at its upper end and engaging the tamper carrier at its lower end to hold it against movement during movement of the mold carrier, and a cam on the mold carrier for engaging the lower end of the latch to move it from engagement with the tamper carrier.

11. In a block machine, a frame embodying upright posts, a mold carrier slidable on the posts, a tamper carrier also slidable on the posts above the mold carrier, a mold supported by its carrier, a tamper also supported on its carrier, means for elevating the mold carrier independently of the tamper carrier whereby the tamper may remain operative during lifting of the mold carrier and its mold, an outwardly movable, depending latch secured to the frame at its upper end and engaging the tamper carrier at its lower end to hold the tamper carrier against movement during movement of the mold carrier, and a cam on the mold carrier for engaging the latch to move it from engagement with the tamper carrier.

12. In a block machine, a frame, a mold on the frame having a perforated wall, coring rods movable through the perforations of said wall, a member connected to the coring rods to actuate the latter, means to reciprocate the member, and adjustable means between said member and the reciprocating means to enable the extent of the movement of the rods through the mold wall to be regulated.

13. In a block machine, a mold having a perforated wall, coring rods movable through the perforations of the wall, said rods having the upper and lower sides of their forward ends tapered to form points, the sides of the forward ends of the rods being bevelled downwardly to a knife edge so as to press the material both downwardly and outwardly from the interior portion of the body of the material, and tamping means operable on top of the body of the material for forcing the material above the coring rods downwardly.

14. In a block machine, a frame, a mold carrier thereon, a tamper carrier vertically slidable on the frame, means for elevating the mold carrier, an outwardly movable depending latch secured to the frame at its upper end and engaged at its lower end with the tamper carrier to hold the latter stationary, an outwardly extending part on the latch, means on the mold carrier for engaging said outwardly extending part of the latch to move the latter laterally out of engagement with the tamper carrier, and means to operate the mold carrier.

In testimony whereof I affix my signature.

WALTER JOSEPH McCOY.